United States Patent [19]

Hundeby et al.

[11] Patent Number: 5,787,993
[45] Date of Patent: Aug. 4, 1998

[54] FARM IMPLEMENT, WITH MULTI-POSITION SETTINGS

[75] Inventors: David Robert Hundeby; Dean Jay Mayerle, both of Saskatoon, Canada

[73] Assignee: Flexi-Coil Ltd., Saskatchewan, Canada

[21] Appl. No.: 626,514

[22] Filed: Apr. 2, 1996

[51] Int. Cl.$^6$ .................................................... A01B 65/02
[52] U.S. Cl. ..................... 172/616; 172/645; 172/656; 172/683; 172/684; 172/742; 172/763
[58] Field of Search ........................ 172/645, 654, 172/656, 763, 683, 684, 734, 742, 616

[56] References Cited

U.S. PATENT DOCUMENTS

| 342,058 | 5/1886 | Williams | 172/742 X |
|---|---|---|---|
| 1,879,062 | 9/1932 | Brown et al. | 172/742 X |
| 3,049,822 | 8/1962 | McMullen | 172/742 X |
| 3,858,663 | 1/1975 | Lurwig, Jr. | 172/742 X |
| 4,020,908 | 5/1977 | Kobayasi et al. | 172/742 |
| 4,245,707 | 1/1981 | McClendon | 172/742 X |
| 4,298,071 | 11/1981 | Whitfield et al. | 172/742 X |

FOREIGN PATENT DOCUMENTS

| 1397999 | 3/1965 | France | 172/742 |
|---|---|---|---|
| 598425 | 9/1959 | Italy | 172/742 |
| 625685 | 9/1961 | Italy | 172/742 |
| 183804 | 5/1963 | Sweden | 172/742 |

Primary Examiner—Randolph A. Reese
Assistant Examiner—Christopher J. Novosad
Attorney, Agent, or Firm—Anthony Asquith & Co.

[57] ABSTRACT

Many openers are mounted on the lateral tool-bar of a farm implement. For crop and fertilizer change, different spacings along the tool-bar are required for the openers. Multi-position tool-mounting structures are provided, for each opener as required. Each has a pivoting arm, which may be locked in one of several positions. The locked-in position of each arm may be changed manually, and independently of the other tools, upon manually releasing a biassed locking pin. Adjustment to cater to the next application is light, quick, simple, and accurate.

17 Claims, 6 Drawing Sheets

1

FARM IMPLEMENT, WITH MULTI-POSITION SETTINGS

This invention relates to an agricultural implement, of the type that is drawn, or otherwise moves, over the ground, in which a tool-bar component of the implement extends laterally with respect to the direction of movement of the implement, and in which many ground-engaging tools are mounted on the tool-bar.

BACKGROUND TO THE INVENTION

The invention may be applied, for example, to an implement having many openers of the kind used for planting crop seeds in rows.

Corn and soybeans are of major crops that are planted using row crop implements. A conventional crop rotation is to alternate corn and soybeans yearly. Typically, corn is planted in rows spaced 30 inches (76 cm) apart; and soybeans in rows planted 7 to 15 inches (18 to 38 cm) apart.

In addition to the differences in seed spacing, the requirements for fertilizer etc. placement are also different for the two crops. Good results are obtained with corn crops when phosphate/potassium fertilizer is placed close to the seeds, nitrogen fertilizer being spaced a larger distance from the seeds. Fertilizers are often not used at all with soybeans.

The invention may be applied to give, on the one hand, the close and spaced-apart fertilizer rows for corn, and to give, on the other hand, the correct row spacing for soybean seeds, where the farmer makes the changeover between the two spacing requirements.

GENERAL FEATURES OF THE INVENTION

It has been the general rule for farmers practicing yearly rotation of con and soybeans (for example) to purchase two implements. One is dedicated to the spacings appropriate for corn, and the other to the spacings for soybeans. Of course, it would be possible for the farmer to adjust the positions of the openers and other tools along the tool bar for each season and/or crop type, and back tile next year, whereby oily one implement was required. But such is not the current practice, due to the time-consuming and tiresome task of measuring, adjusting, and setting the positions of the tools. The farmer purchases two implements, and leaves the two implements with their openers adjusted appropriately respectively to the two crops.

It is an aim of the invention to provide an apparatus in which the task of changing the spacings of the openers is rendered much simpler. It is an aim also that the task of changing spacings may be accomplished with a minimum use of tools, and with a minimum of handling and manipulation of components on the part of the farmer. It is an aim that the spacing settings may be easily recorded, if desired, and re-set to the same settings. It is an aim that the spacing, once set, will remain accurately in the as-set positions.

The invention lies in mounting each of the tools (i.e. openers) that has to be moved, by means of a respective multi-position tool-mounting-means. As will be described, the multi-position tool-mounting-means permits the respective tool to be moved, independently, by simple manipulation, upon release of a respective locking pin.

The positioning results are subject to much less variance across the width of the machine with less verification and measurement by the farmer and, thus, more secure. Once specified and tested the same results can be quickly achieved from each work session or from year to year for each user independent of others and with less error and variation.

Further, the multi-position tool-mounting-means permits the movable arm to be pivotally attached on a side of the tool bar and the locking means onthe other side thereof which provides a degree of structural integrity and an economy of both materials and overall length in the direction of travel.

DETAILED DESCRIPTION OF PREFERRED EMBODIMENTS

By way of further explanation of the invention, exemplary embodiments of the invention will now be described with reference to the accompanying drawings, in which.

Figure 1:
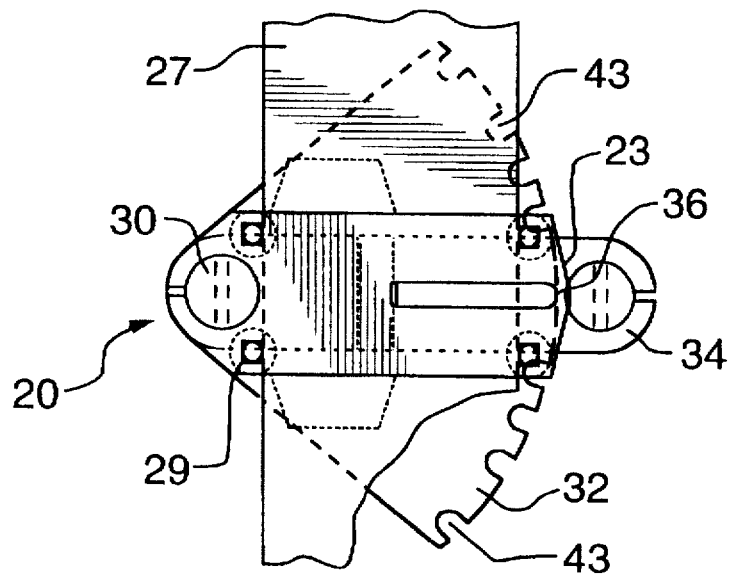
FIG. 1 is a plan view of a tool-bar of a farm implement, to which is secured a multi-position tool-mounting-means in accordance with the invention.
Figure 2:
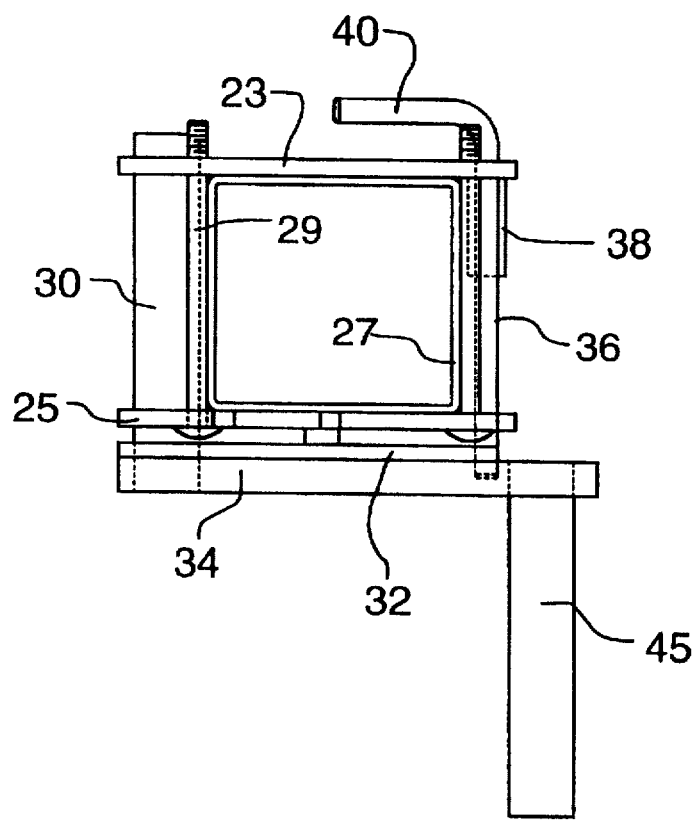
FIG. 2 is a side elevation ofthe components shown in FIG. 1.

The apparatuses shown in the accompanying drawings and described below are examples which embody the invention. It should be noted that the scope of the invention is defined by the accompanying claims, and not necessarily by specific features of exemplary embodiments. The tool-mounting-means 20 shown in the drawings includes top and bottom clamp-plates 23,25. These are clamped to the tool-bar 27 of the implement by means of four clamp-bolts 29. Once clamped, the clamp plates remain in a fixed position relative to the tool-bar.

The clamped-on top and bottom clamp-plates 23,25 carry a pivot-pin 30. The pivot-pill 30 is guided for pivoting with respect to the clamp-plates, and hence with respect to the tool-bar. The pivot-pin 30 carries at its lower end a quadrant-plate 32, and a pivot-bar 34, the quadrant-plate 32 and the pivot-bar 34 being secured together so as to pivot in unison about pivot-pin 30.

A locking-pin 36 is molted between the clamp-plates 23,25. Tile locking-pin 36 is biassed downwards by means of a spring 38, but the locking-pin can be raised by lifting the lever 40. When down, the locking-pin 36 engages one of the several notches 43 provided in the quadrant-plate 32, thereby preventing the quadrant-plate 32, and the pivot-bar 34, from pivoting about the pivot-pin 30. When the locking-pin 36 is (manually) raised, the lower end of the locking-pin moves clear of the notches, and the quadrant-plate and pivot-bar are free to move.

Figure 3:
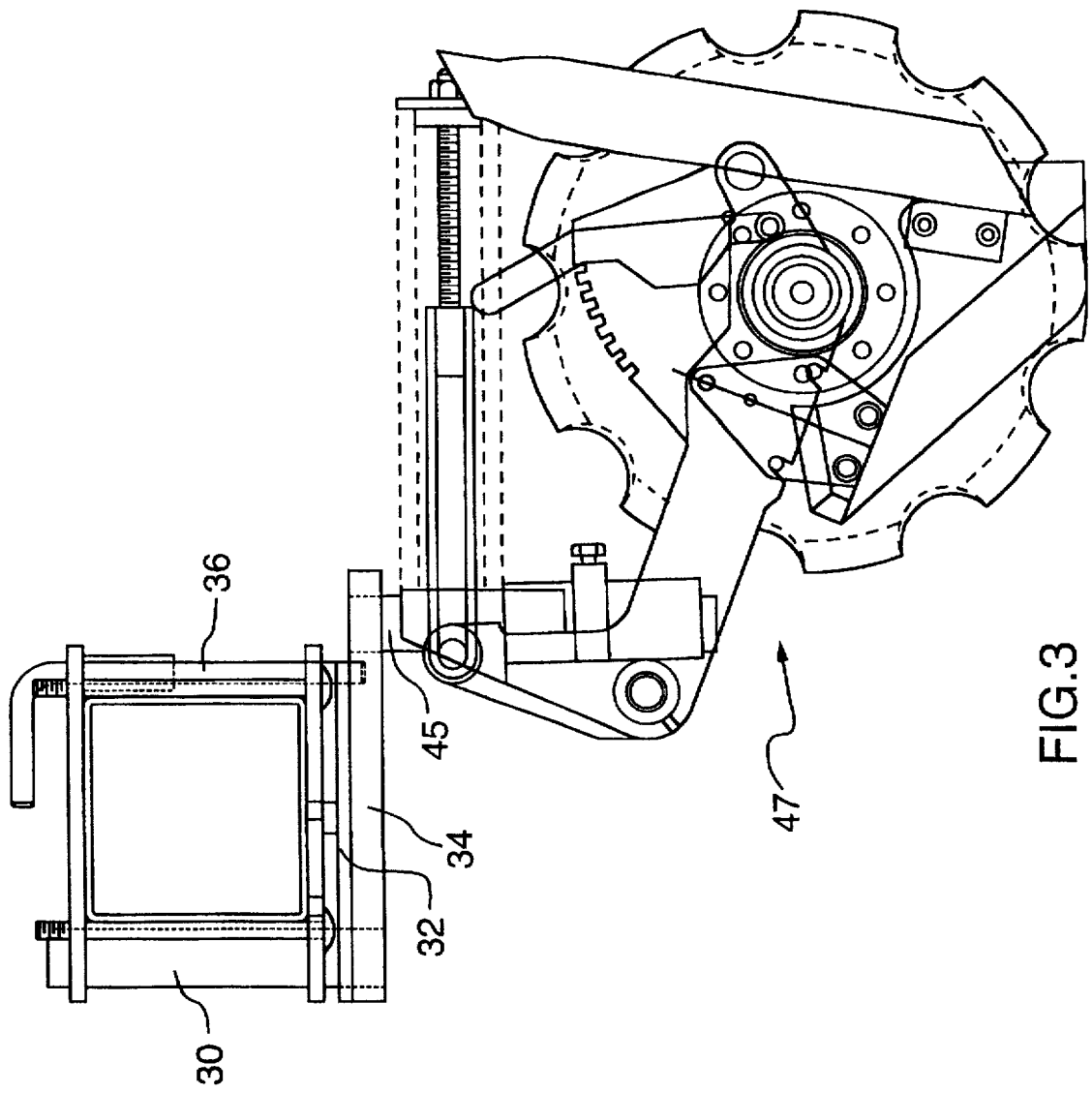
FIG. 3 is the same view as FIG. 2, but with an opener device also included.

A tool-pin 45 is carried at the outer end of the pivot-bar 34. As shown in FIG. 3, a ground-engaging tool 47 is mounted on the tool-pin 45 and is guided for pivoting with respect to the tool-pin 45. The tool 47 in fact can pivot about the tool-pill 45, whereby the tool can centre itself in trailing alignment with the tool-pin, during operation. The ground-engaging tool itself (in this case an opener) is conventional and will not be described here.

Figure 4:
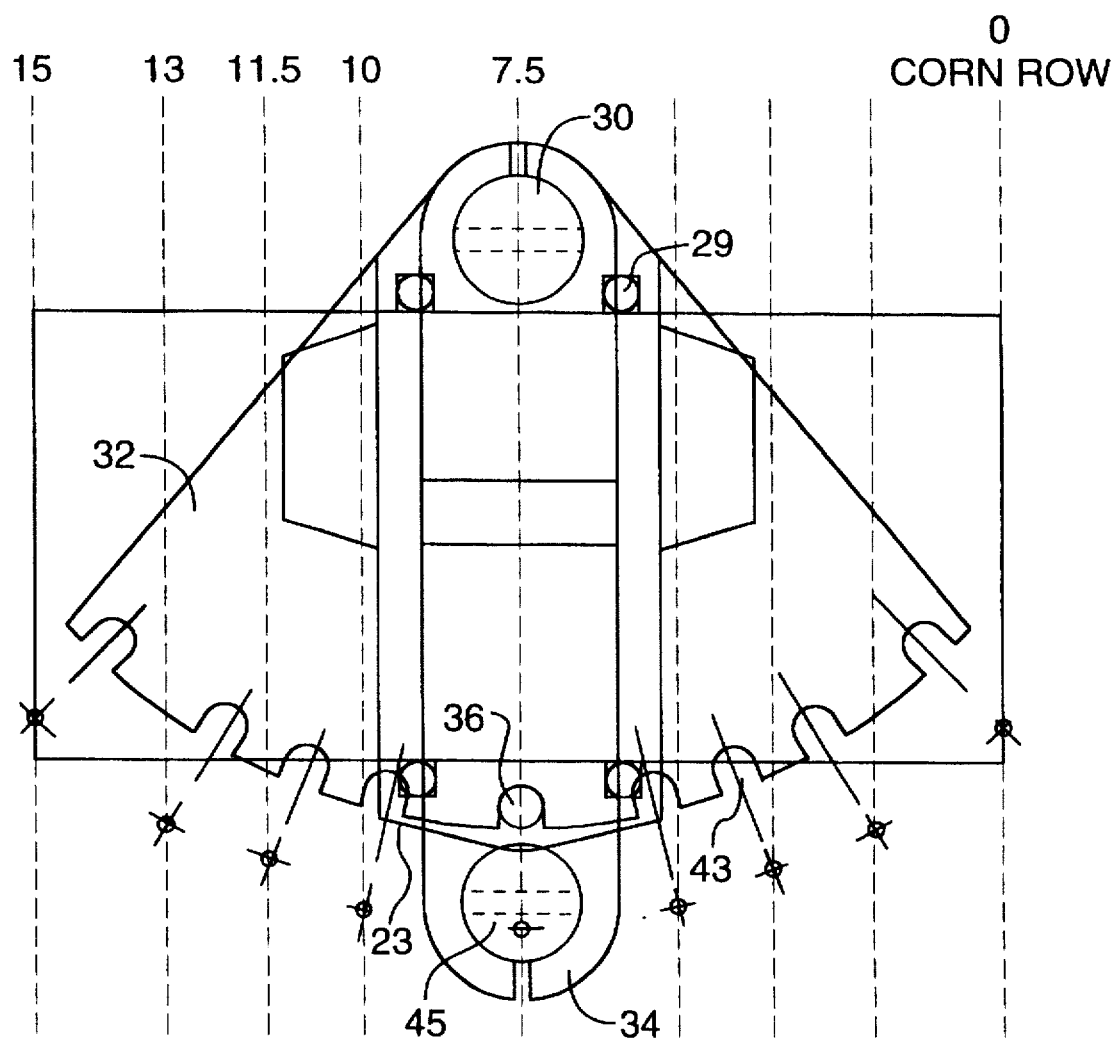
FIG. 4 is an enlarged plan view corresponding to FIG. 1, showing a range of adjustment positions.

FIG. 4 shows the spacings that are available from a typical series of notches, as measured from a datum on the tool-bar.

Figure 5:
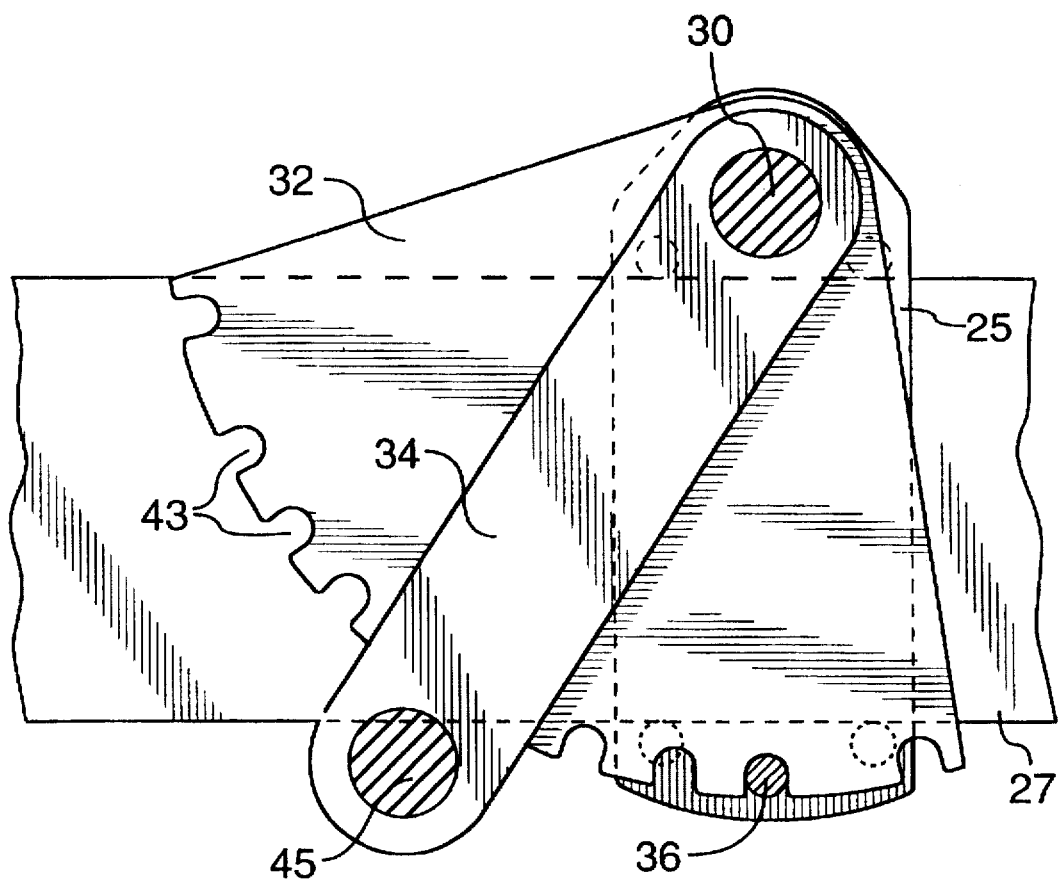
FIG. 5 is the same view as FIG. 4, shown at a different orientation.

FIG. 5 shows the pivot arm and quadrant-plate aligned to, and locked in, a new orientation.

Figure 6:
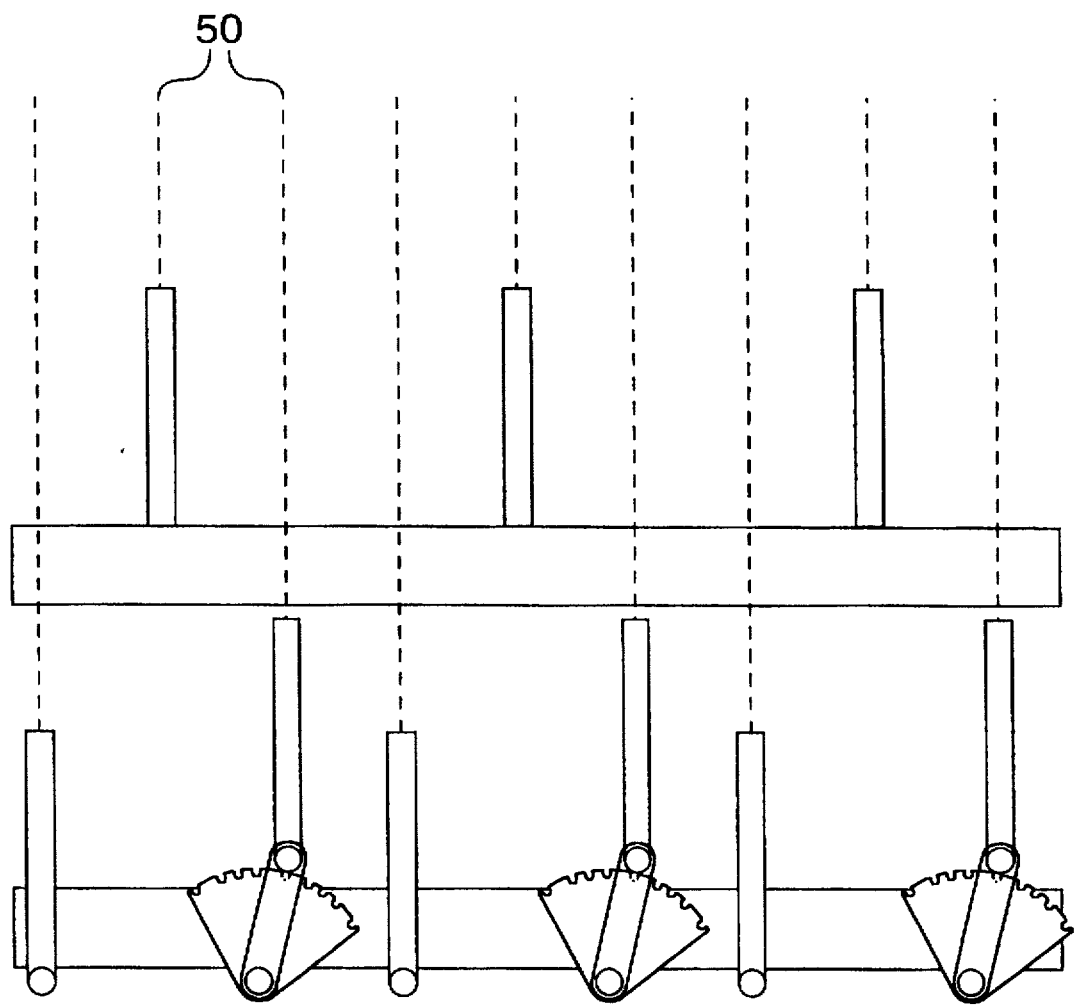
FIG. 6 is a plan view of a field in which rows of soybeans are being planted.

FIG. 6 is a plan of a field, in which rows 50 of soybean seeds are being planted. The tool-bar 27 extends laterally, with respect to the direction of motion of the implement, and the seeds are being planted by the operation of the several openers 47 mounted oil the several tool-mounting-means 20, which are clamped to the tool-bar.

In FIG. 6, the rows of soybean seeds are being planted 10 inches (25 cm) apart: that is to say, the several tool-mounting-means 20, and the several openers 47, are spaced 26 cm apart along the length of the tool-bar 27. The several quadrant-plates 32 of the tool-mounting-means are all locked in the same orientation relative to their respective clamp-plates.

Figure 7:
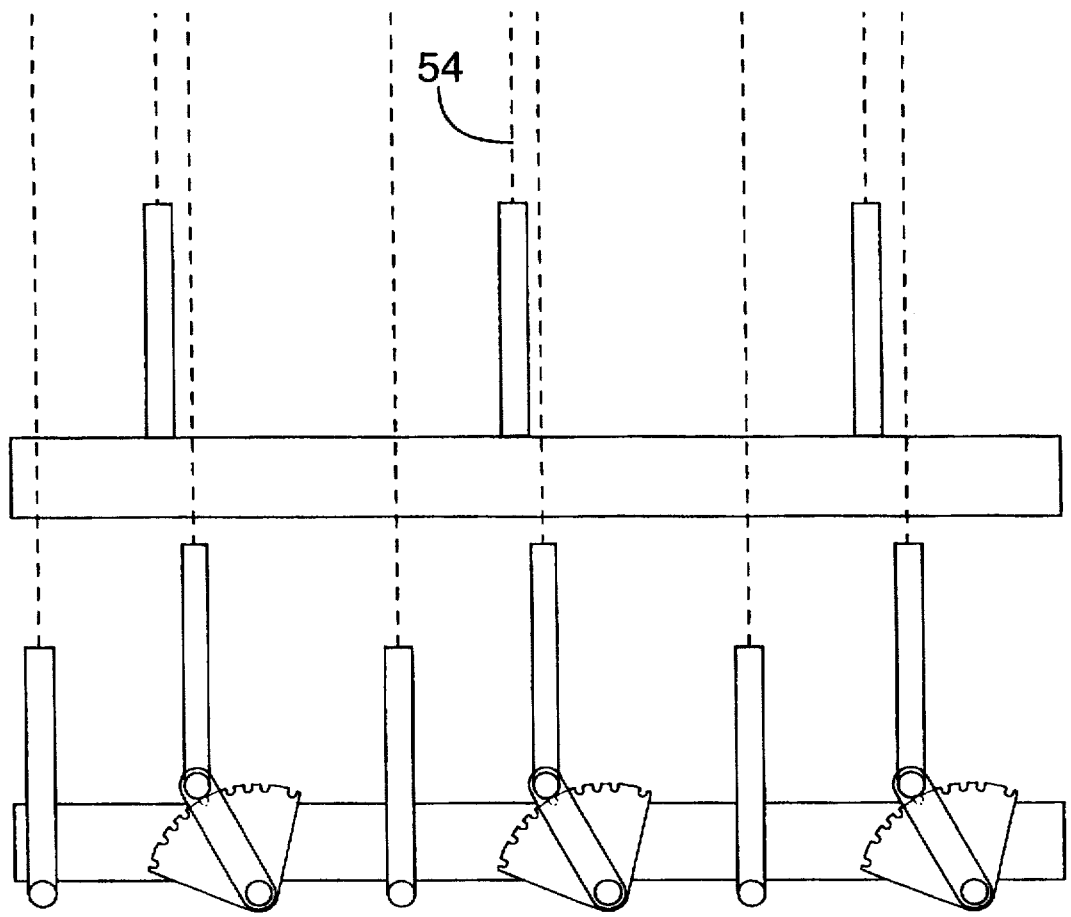
FIG. 7 is a corresponding plan view of a field in which rows of corn are being planted, along with associated fertilizer.

FIG. 7 is a corresponding plan view of a field in which rows 54 of corn seeds are being planted. In this case, the rows of seeds are 30 inches (76 cm) apart. In the case of corn, it is the usual practice to use fertilizers. It can be important, however, to place the fertilizer at a particular distance from the seed, particularly when certain combinations of fertilizer are being used. Thus, for best results, a phosphate/potassium (P/K) fertilizer should be placed 2 to 3 inches (5 to 8 cm) from the seeds; however, a nitrogen fertilizer should be spaced 10inches (25 cm) away from the seeds.

It is recognized that this combination of spacings can be realized with the several tool-mounting-means 20 remaining clamped to the tool-bar 27 in the same 25 cm spacings as were provided for planting the rows of soybean seeds. The openers are now arranged, in repeated groups of three openers; one of the three is arranged to deposit P/K fertilizer, another to deposit nitrogen fertilizer, and the third is arranged to plant the corn seeds. The corn seed rows are 76 cm apart, the P/K fertilizer is spaced 8 cm from the seeds, and the nitrogen is spaced 25 cm from the seeds.

These new spacing settings were achieved simply by lifting the locking-pins 36, turning the quadrant-plates 32, and locking then in the new positions. This task is significantly more simple than the task of preparing a conventional seeder implement for new row spacings, by moving the tools along the tool-bar. The provision of the pivotable quadrant-plates means that the openers can be quickly reoriented to new spacings without the farmer having to expend effort to move the opener itself.

No tools are required for effecting the spacing change; no measurements need be taken (once the settings have been made); and minimal contact with the often awkward-to-handle openers is required.

Other crops, and other farms, may dictate other combinations of spacings than those mentioned in setting up the implement, the farmer determines the range of spacings that he feels will give optimum agricultural results from the two (or more) crops he wishes to rotate. He then determines the actual spacing distances, by laying out the distances apart at which to clamp the tool-mounting-means to the tool-bar, in order that the desired range of adjustment can be achieved by the movement of the quadrant-plates. It is recognized that a very wide range of combinations of acceptable spacing can be achieved using the apparatus as described, whereby virtually every crop rotation likely to be encountered can be accommodated.

It is recognised also that other spacing-variations can be put in place. The farmer might, for example, wish to experiment with seed and fertilizer spacings which he feels are more appropriate for his particular soil and conditions. With the apparatus as described, the farmer can readily vary the spacings slightly (or greatly) between groups of openers, knowing that the settings are easily recorded and reproduced, and knowing that the openers can be counted upon to remain accurately in their set positions.

It is recognised that, in cases where seed-to-fertiliser spacing is important, that the seeds and fertilizer should be placed in the same pass: if the seeds are planted in a first pass, it is very difficult to go over the ground later, and apply the fertilizer in a second pass, with any expectation of achieving proper spacing. With the apparatus as described, by contrast, where all the items are placed in a single pass, even critically-spaced combinations of fertilisers can be readily deployed.

Even when the number of tools is small, the multi-position tool-mounting-means has the advantage that the tool can be adjusted laterally along the tool bar without the tool being manhandled directly. The advantage also is, since the pivot-pin and the tool-pin are vertical, that the tool is neutrally balanced, whereby the tool can be moved and adjusted laterally with only very light manipulation forces.

In changing between different settings for different crops, it is not necessary that all the tool-mounting-means be reset. In many cases, the farmer can arrange that only some need be re-set. In fact, in some cases, especially where the farmer can tailor the positions of the tools very exactly to his requirements, only some of the tool-mounting-means need be adjustable, say two out of each group of three, in that case, the third means may be conventional, and non-adjustable.

We claim:

1. Farm implement, of the kind that is adapted to be drawn, or otherwise moved, over the ground, wherein:

a tool-bar component of the implement extends laterally with respect to the direction of movement of the implement;

the implement includes at least three tool assemblies, each tool assembly comprising a ground-engaging tool and a respective multi-position tool-mounting-means, for mounting and securing the tool on the tool-bar, the at least three tool-assemblies being disposed laterally across the tool-bar;

and wherein, in respect of each multi-position tool-mounting-means;

the multi-position tool-mounting-means includes a body, and includes a means for securing the body fixedly to the tool-bar;

the multi-position tool-mounting-means includes a movable arm;

the multi-position tool-mounting-means includes a means for mounting a near portion of the movable arm onto the body of the multi-position tool-mounting-means and for guiding the movable arm for movement of a far portion of the movable arm relative to the body;

the movable arm includes a means for securing one of the ground-engaging tools to the far portion of the movable arm, the securement being such that movement of the far portion takes place in unison with movement of the tool, being movement in the lateral sense of the tool with respect to the implement;

the multi-position tool-mounting-means includes a locking means, which is operable between a locked condition and an unlocked condition;

and the structure of the locking means is such that, when operated to the locked condition, the locking means is effective to lock the movable bar at a particular orientation of the bar relative to the body, and when operated to the unlocked condition, the locking means is effective to permit free movement of the movable bar relative to the body.

2. Implement of claim 1, wherein the means for securing the body of the multi-position tool-mounting-means fixedly to the tool-bar comprises clamp-plates located one each on opposite sides of the tool-bar, and clamped together onto the tool-bar.

3. Implement of claim 1, wherein the means for mounting the near portion of the movable arm onto the body of the multi-position tool-mounting-means and for guiding the movable arm for movement of the far portion of the movable arm relative to the body comprises an arm-pivot-connection between the near portion of the arm and the body, whereby the aforesaid movement of the movable arm is a pivoting movement about the axis of the arm-pivot-connection.

4. Implement of claim 3, wherein the axis of the arm-pivot-connection is vertical.

5. Implement of claim 4, wherein:

the locking means comprises a manually operable locking-pin, and a locking-plate having at least two recesses, with which the locking-pin is operatively engageable;

the locking-plate is fixedly secured to the movable arm, and the locking-pin is mounted in the body of the multi-position tool-mounting-means;

the locking-pin is spring-biassed into engagement with one of the recesses;

the locking-pin is manually movable against the aforesaid bias in a direction to move the locking-pin clear of the recesses;

whereby the locking-plate and the movable arm are enabled to pivot about the arm-pivot-connection when the locking-pin is manually moved in a direction clear of the recess;

the respective arms of each of the multi-position tool-mounting-means are movable and lockable individually and independently of the arms of the other multi-position tool-mounting-means;

the means for securing one of the ground-engaging tools to the far portion of the movable arm comprises a tool-pivot-connection between the far portion of the arm and the tool, so arranged that the tool is freely pivotable about the axis of the tool-pivot-connection, whereby, during operation of the implement, the tool is self-biassed to a position of trailing alignment with respect to the tool-pivot-connection;

the axis of the tool-pivot-connection is vertical;

and the weight of the tool is neutral and non-biassing with respect to the pivoting movement of the arm.

6. Implement of claim 5, wherein:

the tool is located in a trailing configuration with respect to the tool-bar;

the arm-pivot-connection and the locking pin are located one each side of the tool-bar;

the arm-pivot-connection is located in a leading configuration, and the locking pin is located in a trailing configuration, with respect to the tool-bar, the arm-pivot-connection being located on the opposite side of the tool-bar from the tool.

7. Implement of claim 5, wherein:

the tool is located in a leading configuration with respect to the tool-bar;

the arm-pivot-connection and the locking pin are located one each side of the tool-bar;

the arm-pivot-connection is located in a trailing configuration, and the locking pin is located in a leading configuration, with respect to the tool-bar, the arm-pivot-connection being located on the opposite side of the tool-bar from the tool.

8. Implement of claim 1, wherein the locking means comprises a manually operable locking-pin, and a locking-plate having at least two recesses, with which the locking-pin is operatively engageable.

9. Implement of claim 8, wherein the locking-plate is fixedly secured to the movable arm, and the locking-pin is mounted in the body of the multi-position tool-mounting-means.

10. Implement of claim 9, wherein:

the arm-pivot-connection and the locking pin are located one each side of the tool-bar;

the arm-pivot-connection is located in a leading configuration, and the locking pin is located in a trailing configuration, with respect to the tool-bar, the arm-pivot-connection being located towards the opposite side of the tool-bar from the tool.

11. Implement of claim 9, wherein:

the arm-pivot-connection and the locking pin are located one each side of the tool-bar;

the arm-pivot-connection is located in a trailing configuration, and the locking pin is located in a leading configuration, with respect to the tool-bar, the arm-pivot-connection being located on the opposite side of the tool-bar from the tool.

12. Implement of claim 9, wherein:

the locking-pin is spring-biassed into engagement with one of the recesses;

the locking-pin is manually movable against the said bias in a direction to move the locking-pin clear of the recesses;

whereby the locking-plate and the movable arm are enabled to pivot about the arm-pivot-connection when the locking-pin is manually moved, in a direction clear of the recess.

13. Implement of claim 12, wherein the respective arms of each of the multi-position tool-mounting-means are movable and lockable individually and independently of the arms of the other multi-position tool-mounting-means.

14. Implement of claim 1, wherein the means for securing one of the ground-engaging tools to the far portion of the movable arm comprises a tool-pivot-connection between the far portion of the arm and the tool, so arranged that the tool is pivotable about the axis of the tool-pivot-connection, whereby, during operation of the implement, the tool is self-biassed to a position of trailing alignment with respect to the tool-pivot-collection.

15. Implement of claim 14, wherein the axis of the tool-pivot-connection is vertical.

16. Implement of claim 1, wherein the weight of the tool is neutral and non-biassing with respect to the pivoting movement of the arm.

17. Implement of claim 1, wherein the implement also includes some tool-bar-mounted tools that are fixed against lateral movement relative to the tool-bar.

\* \* \* \* \*